Jan. 28, 1964 YOSHIKAZU ARITA 3,119,975
VARIABLE INDUCTANCE MAGNETIC CORE
Filed Dec. 29, 1960 2 Sheets-Sheet 2
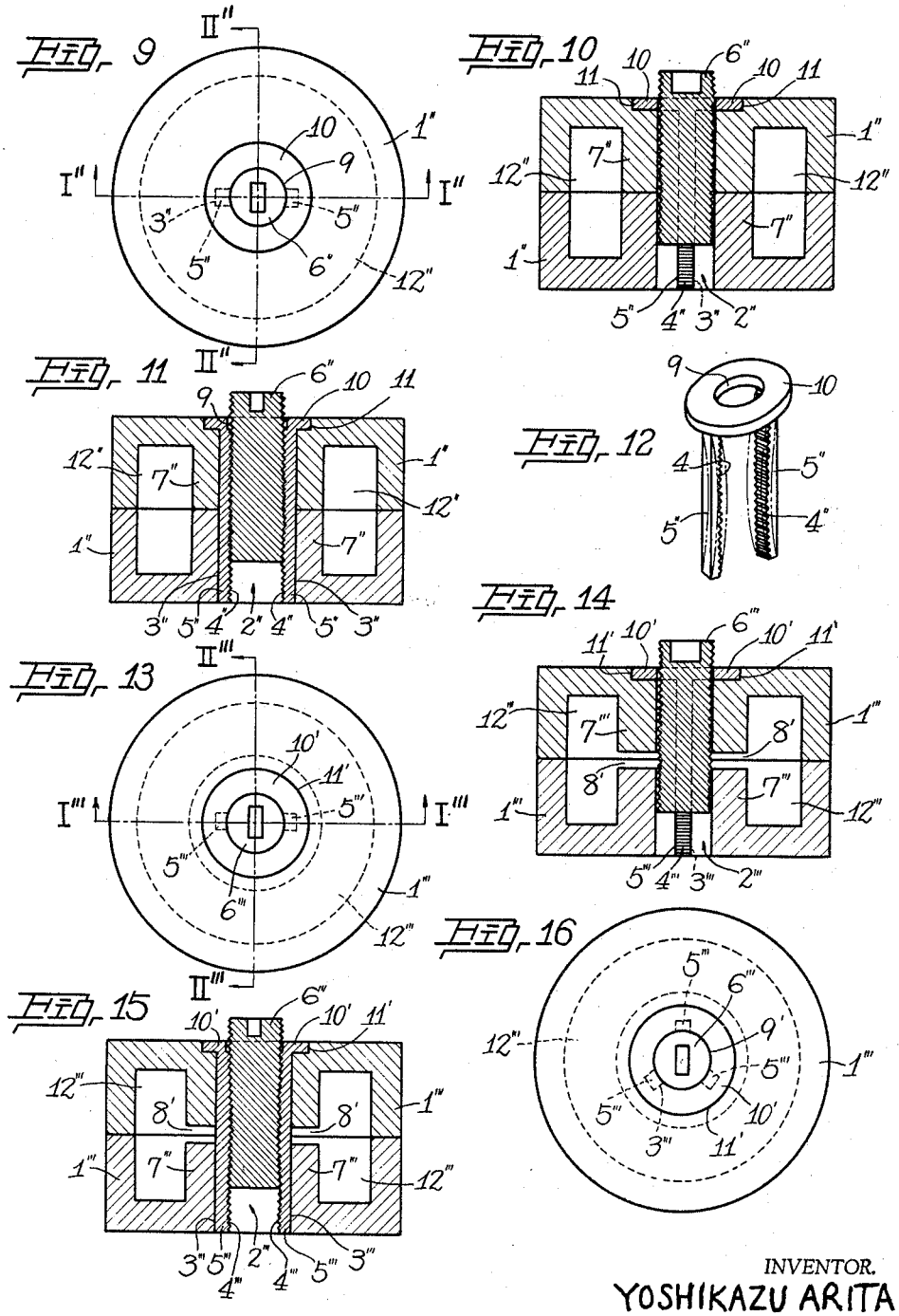
INVENTOR.
YOSHIKAZU ARITA
BY Blum Moscovitz,
Friedman & Blum
ATTORNEYS

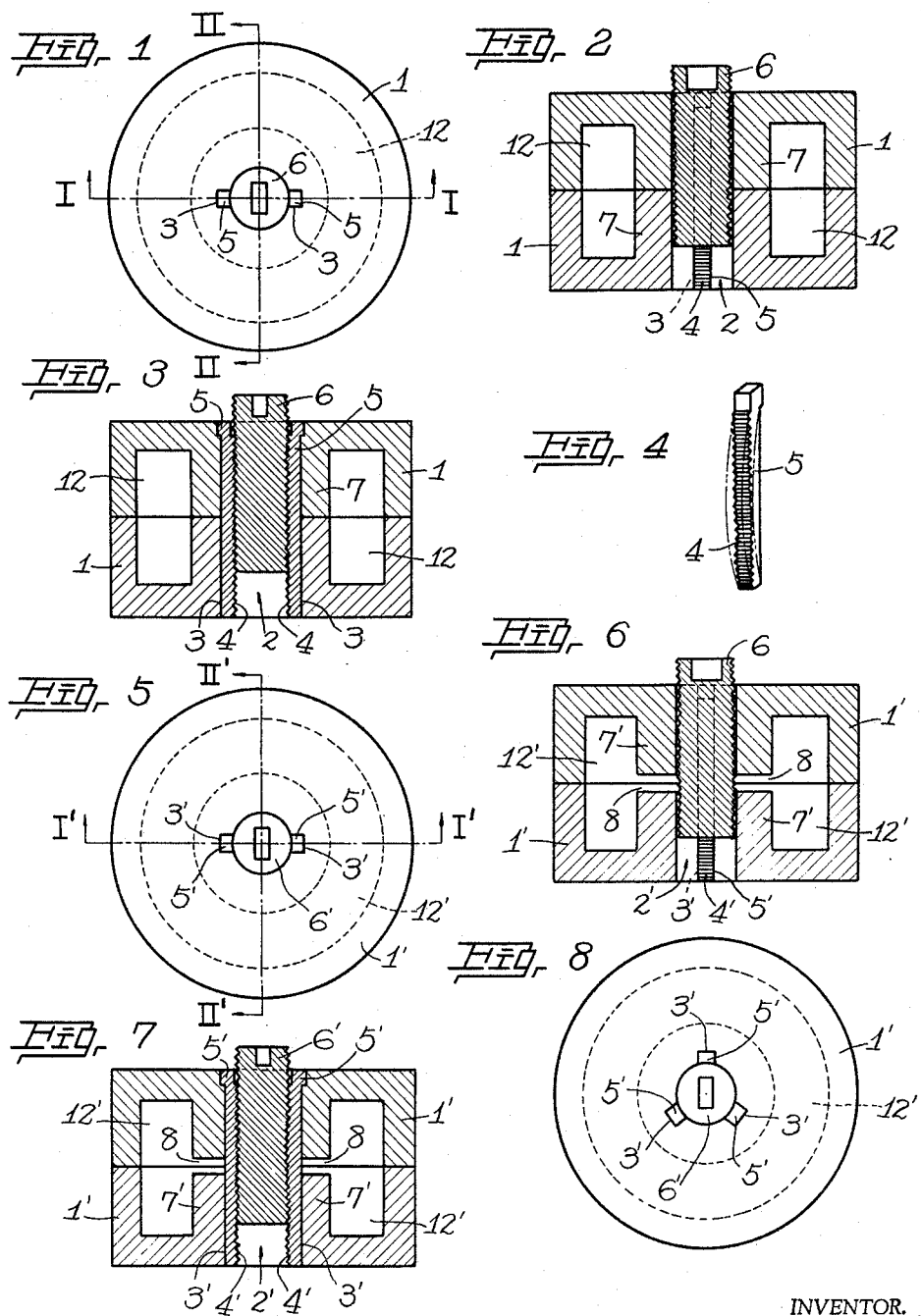

United States Patent Office 3,119,975
Patented Jan. 28, 1964

3,119,975
VARIABLE INDUCTANCE MAGNETIC CORE
Yoshikazu Arita, Ichikawa-shi, Chiba-ken, Japan, assignor to Tokyo Denki Kagaku Kogyo Kabushiki Kaisha, Tokyo, Japan
Filed Dec. 29, 1960, Ser. No. 79,293
5 Claims. (Cl. 336—136)

The present invention relates to an improvement in a variable inductance of the type including a central paramagnetic core adjustable coaxially of an annular or tubular paramagnetic core or supporting member. More particularly, the present invention is directed to an improved construction of the supporting member, or annular or tubular core.

Heretofore, in the present type of magnetic core made from moulded and sintered oxide, for example, ferrite magnetic core, due to the difficulties of providing a thread on the inner wall surface of the hollow shaft for insertion therein of a movable magnetic core for varying inductance, it has been a general measure, for supporting the movable magnetic core, to provide an insert in the form of a threaded tubular metal member, or alternatively a threaded tubular non-magnetic member made of an artificial resin, having a threaded inner wall surface, the tubular member being embedded in the hollow shaft and the externally threaded magnetic core for varying inductance being threaded into the tubular member. However, there have been found practical disadvantages and drawbacks in the above type supporting means, in that the magnetic spacing, i.e. the spacing between the peripheral magnetic core and the inductance varying core, is increased due to the interposition of the tubular member, resulting in decreasing the effective permeability, or the range of variability of the permeability, of the magnetic core, and in making the effective permeability extremely unstable due to varying the same irregularly by oscillation or shock even after an adjustment. In addition, the manufacturing cost is high. Accordingly, the present invention is directed to an improved variable inductance core assembly which is free of the various defects of the prior art, and particularly to an improvement in the construction of the annular or tubular supporting member of the variable inductance assembly.

One object of this invention is to provide a variable inductance magnetic core in which the thick walled tubular member hitherto inserted inside the hollow shaft of the peripheral magnetic core is eliminated, whereby the major portion of the peripheral extent of the wall of the hollow shaft is exposed, and the outer surfaces of threads of the inductance varying central paramagnetic core are close enough to the shaft wall surface that the magnetic reluctance of the air gap is very substantially decreased.

Another object of the present invention is to provide a variable inductance in which the effective permeability may be varied over a wide range, i.e. the range of variation may be expanded substantially.

Still another object of the present invention is to provide for the main magnetic path to be varied very effectively by virtue of the noticeable decrease of the magnetic reluctance across the air gap even if the magnetic core is composed of a substance of high permeability, for example, a ferrite magnetic core in particular.

Further another object of the present invention is to provide so that an appreciably wide range of variation may be realized by means of providing a suitable air gap between the facing ends of the central legs of the peripheral magnetic core.

A still further object of the present invention is to provide structure in which a rack-like rod member, formed with a longitudinal curvature so as to have a restoring force tending to maintain its curvature by virtue of the elasticity of the material, is inserted in the hollow shaft of the peripheral magnetic core and threadedly engaged with an inductance varying central magnetic core, whereby it is possible to assure stable retention of the inductance varying central magnetic core in its adjusted position due to the elastic pressure thereon by virtue of the restoring force of the rack-like rod member in the hollow shaft.

A still further object of the present invention is to provide a structure in which a plurality of such rack-like rod members are assembled with and fixed in the hollow shaft by means of a flange uniting the upper ends of the rack-like rod members and seating in an annular recess formed in the upper end of the peripheral magnetic core, the flange conforming to the recess so as to fixedly maintain a predetermined position of the rack-like rod members with respect to the hollow shaft of the periperal magnetic core whereby it becomes possible to hold the movable magnetic core stably and surely after an adjustment of position.

The invention will be better understood and other objects and additional advantages of the invention will become apparent upon perusal of the following description taken in connection with the drawings, and the scope of the invention will be defined in the appended claims.

In the drawings:

FIG. 1 is a plan view of an embodiment of this invention;

FIG. 2 is an axial side-sectional side-view thereof taken along line I—I of FIG. 1;

FIG. 3 is an axial front-sectional front view thereof taken along line II—II of FIG. 1;

FIG. 4 is a perspective view of a rack-like rod member;

FIG. 5 is a plan view of the second embodiment;

FIG. 6 is an axial side-sectional side view thereof taken along line I'—I' of FIG. 5;

FIG. 7 is an axial sectional view thereof taken along line II'—II' of FIG. 5;

FIG. 8 is a plan view of the third embodiment;

FIG. 9 is a plan view of the fourth embodiment;

FIG. 10 is an axial sectional view taken along line I"—I" of FIG. 9;

FIG. 11 is an axial sectional view taken along line II"—II" of FIG. 9;

FIG. 12 is a perspective view of the rack-like rod member used in FIGS. 9, 10 and 11;

FIG. 13 is a plan view of the fifth embodiment;

FIG. 14 is an axial sectional view taken along line I'''—I''' of FIG. 13;

FIG. 15 is an axial sectional view taken along line II'''—II''' of FIG. 13; and

FIG. 16 is a plan view of the sixth embodiment.

Referring now to drawings, some embodiments of this invention will be described.

In the first embodiment as shown in FIGS. 1, 2, 3, and 4, there is a tubular paramagnetic core or supporting member 1 having a hollow shaft or axially central passage 2 provided for varying inductance. A pair of flutes 3 are formed in the wall of the hollow shaft 2 running along the extension of the shaft or parallel to the central axis, which flutes have a rather very small arcuate extent compared with the entire arcuate extent of the hollow shaft. In each flute is held, in an inserted relation, a rack-like rod member 5 shaft in such a manner that such member is threaded on a part 4 of its surface in a rack-like fashion, and made of a material of non-magnetic or diamagnetic properties, being composed of such material as nonmetal, nonmagnetic metal or artificially synthesized resin such as plastics and the like. An externally threaded rod-shaped paramagnetic solid core 6, for varying inductance by axial movement relative to core 1, is threadedly engaged with the rack-like rod members 5.

Thus the paramagnetic core 6 is maintained in engagement with the surface of hollow shaft 2.

Regarding to the flutes which are formed in the inner wall surface of the hollow shaft 2 and having only a small arcuate extent as compared with the peripheral extent of the inner wall surface of the hollow shaft, there are a pair facing each other as illustrated in FIG. 1. However, there may be three flutes, each receiving a rack-like member, as illustrated in FIG. 8, or four or more flutes, each with a rack-like member therein, may be used as necessary or desirable. Thus it is to be seen that a limit is not placed on the number of the flutes. In particular, the present invention is characterized in that the conventional threaded tube inserted within the hollow shaft 2 and extending contiguously completely around its entire inner surface is eliminated, so that the inner surface of the hollow shaft is exposed throughout the major portion of its peripheral extent. It is further possible to position the threaded surface of an inductance varying magnetic core 6 extremely close to the surface of the hollow shaft as shown in FIG. 2, whereby the magnetic reluctance at the air gap is made extremely small, also due to the reduced area of the rack-like rod member 5 as shown in FIG. 4. When the rack-like rod member 5 is made of an elastic material so as to restore to a curved shape by the elastic action, as shown by chain lines in FIG. 4, the core 6 threadedly engaged with the rack-like rod members 5 is pressed elastically by the latter so as to be held in an adjusted position with certainty. Numeral 7 indicates the central legs of the peripheral magnetic core 1.

When a considerably large variability is required, that is, when a larger range of variation in inductance is wanted, such requirement may be satisfied by providing a suitable air gap 8, as shown in FIGS. 6 and 7 of the second embodiment, between the ends of the central legs 7′ of the peripheral magnetic core 1′. In the second embodiment, the peripheral magnetic core 1′, hollow shaft 2′, flutes 3′, threaded surface 4′, rack-like rod member 5′, and inductance varying magnetic core 6′ have structures similar to the corresponding members of the first embodiment, respectively.

Referring now to FIGS. 9, 10, 11, and 12, illustrating the fourth embodiment, and to FIGS. 13, 14, 15 and 16, illustrating the fifth embodiment of this invention, similarly to the preceding examples, there is a peripheral magnetic core 1″, 1‴ having a hollow shaft 2″, 2‴ provided for varying inductance. Flutes are formed in the wall of the hollow shaft running parallel to the central axis, which flutes have a rather small arcuate extent as compared with the entire peripheral extent of the hollow shaft. In each flute is held, in an inserted relation a rack-like rod member 5″, 5‴ threaded on a part 4″, 4‴ of its surface in a rack-like fashion, and made of a material of non-magnetic property, being composed of such material as nonmetal, non-magnetic metal or artifically synthesized resin such as plastics and the like. An externally threaded rod shaped magnetic core 6″, 6‴, for varying inductance by movement relative to core 1″, 1‴ is threadedly engaged with the rack-like rod members 5″, 5‴. Thus the magnetic core 6″, 6‴ is held by and in engagement with the hollow shaft 2″, 2‴. Further in the fifth embodiment, similarly to the embodiment shown in FIGS. 6 and 7, a suitable supplementary air gap 8 is provided between the ends of the central legs 7‴ of the peripheral magnetic core 1‴. As distinguished from the arrangements of FIGS. 1 through 8, the rack-like members 5″, 5‴ are not used individually but two or more of such members are arranged in opposing relation with each other as integral extensions from an annular flange 10, 10′ having an opening 9, 9′ for insertion of the core 6″, 6‴.

For assembly of the flange 10 and 10′, assembled with the rack-like rod members 5″ and 5‴, into the supporting structure 1″, 1‴, there is provided a concentric recess 11 and 11′ on the upper end of the hollow shaft 2″ and 2‴ of the peripheral magnetic core 1″ and 1‴. The seating of the flange 10 and 10′ into the recesses 11 and 11′ assures retention in position of the rack-like rod members 5″ and 5‴ within the hollow shaft 2″ and 2‴ of the peripheral magnetic core 1″ and 1‴. Thus retention of the inductance varying magnetic core 6″ and 6‴ in correct position after adjustment is assured. Numerals 12, 12′, 12″ and 12‴ indicate spaces for windings. The peripheral magnetic cores, hollow shafts, flutes, threaded fronts, rack-like rod members, inductance varying magnetic cores, and central legs are constructed similarly to the preceding embodiments.

In each of the embodiments, on turning the inductance varying magnetic core 6, 6′, 6″, 6‴, it may be screwed or unscrewed relative to the hollow shaft 2, 2′, 2″, 2‴ of the peripheral magnetic core 1, 1′, 1″, 1‴ for adjusting the variation in inductance in the same way as in the conventional procedure. However, by virtue of this invention characterized in that there is a rather large exposed area on the inner surface of the hollow shaft 2, 2′, 2″, 2‴ of the peripheral magnetic core 1, 1′, 1″, 1‴ and it is unnecessary to interpose a non-magnetic sleeve or tube, the inner wall surface of the hollow shaft is made to approach very close to the threaded surface of the inner magnetic core 6, whereby it becomes possible to reduce the magnetic reluctance owing to the space between the hollow shaft and the inner magnetic core as compared with such a conventional structure having a threaded tube interposed therebetween, and whereby the range within which the inductance may be varied is enlarged remarkably.

The present invention, when applied, in particular, in such an instance where the magnetic core is composed of a material of high permeability such as ferrite, is also advantageous because permeability along the main magnetic path is varied effectively due to the noticeable decrease in magnetic reluctance at the air gap between the hollow shaft and the inductance varying magnetic core. Thus it is possible to vary the effective permeability by several percent using a magnetic core made of a material of a matter of $\mu_0=500$. Also, when a substantially wide range of variability in inductance is required, such requirement may be attained by means of providing a supplementary air gap 8, 8′ as illustrated in the drawings of the second and fifth embodiments. When the rack-like rod member 5 is made of an elastic material having an action of restoring to a curved shape, as shown in FIGS. 4 and 12 by chain lines, by utilizing the restoring elasticity, and when the rack-like rod member 5 and the flange of the supporter 10, 10′ are assembled into one body as shown in FIGS. 9 through 16, by forming a groove 11, 11′ on the upper end of the inner wall of the hollow shaft so as to engage with the flange 10, 10′ of the supporter, it becomes possible to ensure positioning the rack-like rod member 5″, 5‴ within the flute 3″, 3‴ regularly and to stabilize the inductance varying magnetic core 6″, 6‴ held inside the hollow shaft so as to keep the former securely in an adjusted position.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by the Letters Patent of the United States is:

1. A variable inductance magnetic core assembly comprising, in combination, a hollow annular core of paramagnetic material having axially spaced ends and a cylindrical inner wall defining a cylindrical passage extending axially therethrough, the cylindrical surface of said passage having at least a pair of angularly spaced slots extending longitudinally thereof and opening into said passage, and the combined angular extent of said slots being a minor fraction of the peripheral extent of said passage; relatively elongated rack members each engaged in one of said slots and having radial thicknesses substantially equal to the radial depths of said slots, the radially inner face of each rack member having nonmagnetic rack teeth thereon extending into said passage; and a substantially solid one-piece relatively elongated cylindrical core of paramagnetic material continuously externally threaded to engage said rack teeth for displacement of said solid core axially of said passage by relative rotation of said cores, the thread crest diameter of said solid core being substantially equal to the diameter of said passage; said rack members being elastic and being bowed longitudinally, with the concave surface of the bow facing radially outwardly of said hollow core.

2. A variable inductance magnetic core assembly, as claimed in claim 1, in which said inner cylindrical wall is continuous between the axially spaced ends of said hollow core.

3. A variable inductance magnetic core assembly, as claimed in claim 2, in which there are two slots spaced angularly 180 degrees from each other, and in which there are two rack members each engaged in a respective one of said slots.

4. A variable inductance magnetic core assembly, as claimed in claim 2, in which there are three slots spaced angularly 120 degrees from each other, and in which there are three rack members each engaged in a respective one of said slots.

5. A variable inductance magnetic core assembly, as claimed in claim 1, in which said inner cylindrical wall is discontinuous intermediate the axially spaced ends of said hollow core to provide an air gap.

References Cited in the file of this patent

FOREIGN PATENTS

| 847,176 | Germany | Aug. 21, 1952 |
| 893,384 | Germany | Oct. 15, 1953 |